United States Patent [19]

Hao-Chung et al.

[11] Patent Number: 5,470,553

[45] Date of Patent: Nov. 28, 1995

[54] METHOD FOR SEPARATING COBALT, NICKEL, AND ALUMINUM IONS IN SULFURIC ACID AQUEOUS SOLUTIONS AND THE EXTRACTANT COMPOSITIONS USED THEREIN

[75] Inventors: Hsia Hao-Chung; Tei-Chih Cheau; Shang-Lin Tsai, all of Hsinchu, Taiwan

[73] Assignee: Industrial Technology Research Institute, Hsinchu, Taiwan

[21] Appl. No.: 163,481

[22] Filed: Dec. 7, 1993

[51] Int. Cl.$^6$ .......................... B01D 11/00; C22B 23/00; C22B 21/00
[52] U.S. Cl. ............................................ 423/139; 423/531
[58] Field of Search ..................... 423/139, 531, 423/DIG. 2

[56] References Cited

U.S. PATENT DOCUMENTS

| | | | |
|---|---|---|---|
| 3,455,680 | 7/1969 | Ashbrook et al. | 75/117 |
| 4,088,733 | 5/1978 | De Schepper et al. | 423/139 |
| 4,657,642 | 4/1987 | Miller et al. | 204/59 M |
| 4,721,606 | 1/1988 | Tilley | 423/139 |

FOREIGN PATENT DOCUMENTS

| | | | |
|---|---|---|---|
| 0210387 | 2/1987 | European Pat. Off. | 423/139 |
| 60-231420 | 11/1985 | Japan | 423/139 |
| 1550964 | 8/1979 | United Kingdom . | |

OTHER PUBLICATIONS

Structure for Dibutylbutylphosphonate, registry No. 78-46-6, no date.
Brian K. Tait "The Extraction of Some Base Metal Ions by Cyanex 301, Cyanex 302 and Their Binary Extractant Mixtures with Aliquat 336" Solvent Extraction and Ion Exchange, 10(5), pp. 799-809, 1992, no month.

*Primary Examiner*—Steven Bos
*Attorney, Agent, or Firm*—W. Wayne Liauh

[57] ABSTRACT

A method for separating aluminum, cobalt, and nickel ions contained in a sulfuric acid aqueous solution comprising the steps of (a) contacting a first water-immiscible organic solution containing a first extractant with the sulfuric acid aqueous solution for a period of time to selectively extract the Co ions into the first water-immiscible organic solution so as to obtain a Co-containing first organic phase and a first raffinate aqueous phase containing substantially no Co ions; (b) separating the Co-containing first organic phase from the first raffinate aqueous; (c) contacting a second water-immiscible organic solution containing the first extractant and a second extractant with the first raffinate aqueous solution for a period of time to selectively extract Ni ions into the second water-immiscible organic solution so as to obtain a Ni-containing second organic phase and a second raffinate aqueous phase containing substantially only Al ions; (d) separating the Ni-containing second organic phase from the second raffinate aqueous phase; (e) wherein the said first extractant is dialkyl dithiophosphinic acid or its salt is represented by the following formula:

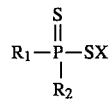

wherein $R_1$ and $R_2$ are $C_6$ to $C_{18}$ alkyl radicals; and X is H, $NH_4^+$, or alkali metal ions; and the second extractant is trialkyl phosphonate is represented by the following formula:

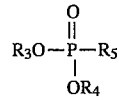

wherein $R_3$, $R_4$, $R_5$ are $C_3$ to $C_{18}$ alkyl radicals. The preferred first extractant is bis (2,4,4-trimethyl pentyl) dithiophosphinic acid and the preferred second extractant is dibutylbutyl phosphonate.

5 Claims, No Drawings

METHOD FOR SEPARATING COBALT, NICKEL, AND ALUMINUM IONS IN SULFURIC ACID AQUEOUS SOLUTIONS AND THE EXTRACTANT COMPOSITIONS USED THEREIN

SCOPE OF THE INVENTION

The present invention is directed to a method for separating cobalt and nickel ions, in sequence, from a sulfuric acid aqueous solution which contains aluminum, cobalt, and nickel ions. This method performs particularly well in a sulfuric acid aqueous solution which has a relative high content of aluminum ions.

BACKGROUND OF THE INVENTION

Catalysts for hydrodesulfurizing petrochemical intermediate products in the petrochemical industry mainly are porous inorganic materials which contain aluminum, nickel, cobalt, molybdenum and vanadium. Generally, after a long period of operation time, the catalysts become poisoned or deactivated during the hydrodesulfurization process. The disposal of the deactivated catalysts is a great concern in industry because of the pollution problems caused by the metal ions contained therein. A typical treatment prior to disposing these catalysts is to remove and recover the metal ions from the catalysts. In a typical recovering process, the poisoned catalysts are calcined in air at 400°–600° C. so that the organic substances deposited thereon are decomposed and removed first, and then the calcined catalysts are cooled down to room temperature and are ground to a powder form. The ground catalyst powder is soaked in a sulfuric acid aqueous solution for a period of time to leach almost all the metal ions contained in the catalyst. The resulting sulfuric acid aqueous solution normally contains vanadium, molybdenum, cobalt, nickel, and aluminum ions. This acidic solution is subjected to an extraction treatment to remove vanadium and molybdenum ions therefrom. Then the aluminum, cobalt, and nickel ions contained in the remaining sulfuric acid aqueous are separated with one another by a sequence of further extraction treatments.

Because there are far more aluminum ions than cobalt and nickel ions, most of the extractants up to the present which extract aluminum ions first, and then cobalt and nickel ions, require not only a large amount of extractant but also an extraction apparatus with a large capacity. From a technical point of view, it would be more effective and economical if the least amount species in a mixture are extracted first, and the more concentrated species are left in the final raffinate (remaining solution). Furthermore, the commercial values of cobalt and nickel are higher than aluminum; therefore, it is more logical to extract cobalt and nickel prior to aluminum ions.

U.S. Pat. No. 4,088,733 discloses a process for removing cobalt from an aqueous acid solution containing cobalt and nickel by liquid-liquid extraction, which comprises the steps of contacting the aqueous acid solution with an organic phase comprising a concentrated alpha hydroxyoxime extractant and an organophosphoric acid such as di(2-ethylhexyl) phosphoric acid.

An object of the present invention is to provide an unique extractant composition to extract nickel ions from a sulfuric acid aqueous solutions which contains aluminum and nickel ions.

Another object of the present invention is to provide a method for separating aluminum, cobalt, and nickel ions contained in a sulfuric acid aqueous solution.

SUMMARY OF THE INVENTION

The method for separating aluminum, cobalt, and nickel ions contained in a sulfuric acid aqueous solution in accordance with the present invention comprises: contacting a first water immiscible organic solution containing an Extractant A dissolved therein with said sulfuric acid aqueous solution for a period of time sufficient to extract substantially all the Co ions into the first organic solution, whereby a first organic phase containing substantially pure Co ions and a first raffinate aqueous phase containing substantially no Co ions are obtained; separating the first organic phase and the first raffinate aqueous phase; contacting a second water immiscible organic solution containing an Extractant A and Extractant B dissolved therein with said first raffinate aqueous solution for a period of time sufficient to extract substantially all the Ni ions into the second organic solution, whereby a second organic phase containing substantially pure Ni ions and a second raffinate aqueous phase containing substantially pure Al ions are obtained; separating the second organic phase and the second raffinate aqueous phase, wherein said Extractant A is dialkyl dithiophosphinic acid or its salt having a formula as follows:

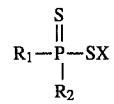

where $R_1$ and $R_2$ are $C_6$ to $C_{18}$ alkyl radicals; and

X is H, $NH_4^+$, or alkali metal ions, and said Extractant B is trialkyl phosphonate having a formula as follows:

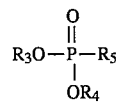

where $R_3$, $R_4$, $R_5$, are $C_3$ and $C_{18}$ alkyl radicals, wherein the total concentration of said Extractant A and B in said second organic solution is 1–80 vol %, and the volume ratio of said Extractant A to said Extractant B is 1:10 to 1:1. Preferably, the total concentration of said Extractant A and B in said second organic solution is 10–40 vol %, and the volume ratio of said Extractant A to said Extractant B is 1:5 to 1:1.

DETAILED DESCRIPTION OF THE INVENTION

Most of the hydrodesulfurization catalysts used in petrochemical processes will lost their activities after a long period of operation time because of being deposited high content of sulfur, coke, and other contaminates, and will be abandoned as a waste, The catalysts contains vanadium, molybdenum, cobalt, nickel, and aluminum which may cause severe environmental problems and nowadays dumping of such highly polluted waste is not allowed by the strict environmental law. If these metals can be recovered, not only may the recovery provide a source of these metals but also can reduce the pollution.

First, the deactivated catalysts generated from the hydrodesulfurization processes are calcined at 400° to 600° C. in air, and then ground to a powder form. The catalyst powders are soaked in a sulfuric acid aqueous solution to dissolve V, Mo, Al, Co, and Ni contained in the catalyst powders in the acidic solution. Because the calcining procedure is performed at relatively mild temperature, during the soaking procedure, most of the aluminum ions are dissolved in the sulfuric acid solution. After the vanadium and molybdenum are extracted from the sulfuric acid aqueous solution, a raffinate sulfuric acid aqueous solution typically contains 85% of aluminum ions and 15% of cobalt and nickel ions. The conventional extraction technique is to use a single extractant such as phosphoric acid, phosphonic acid, or phosphinic acid to separate these ions, and the extraction sequence is Al first, and then Co and finally Ni ions. Under the condition where Al ions concentration is significantly greater than Co and Ni ions, extracting Al ions first not only consumes a large amount of extractant and chemicals, but also requires a large capacity of the extraction equipment; therefore it has disadvantages in terms of cost effectiveness and recovery.

The present invention provides a new extractant composition which makes it possible to extract Co and Ni, sequentially, from a sulfuric acid aqueous solution containing Co, Ni, and Al ions. The extractant composition can be used to extract nickel ions from a sulfuric acid aqueous solution containing Ni, and Al ions, which comprises dialkyl dithiophosphinic acid or its salt as Extractant A; and trialkyl phosphonate as Extractant B, wherein the volume ratio of Extractant A to B is 1:10 to 1:1, preferably, 1:5 to 1:1. Their formula are:

Extractant A:

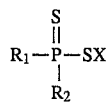

where $R_1$ and $R_2$ are $C_6$ to $C_{18}$ alkyl radicals; and
X is H, $NH_4^+$, or alkali metal ions; and Extractant B:

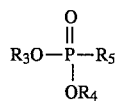

where $R_3$, $R_4$, $R_5$, are $C_3$ to $C_{18}$ alkyl radicals.

The Extractant A is a newly developed extracting agent (Solvent Extraction and Ion Exchange, 10(5), 799–809, 1992), and it can be used to extract various transition metals ions from highly acidic solutions. The present extraction method is first to allow cobalt ions to be extracted by a water immiscible organic solution of the Extractant A from a sulfuric acid aqueous solution containing Co, Ni and Al ions. It is found in the present invention that the a water immiscible organic solution of the Extractant B alone can not effectively extract Co, Ni, and Al ions from the aqueous solution, but a combination of the Extractant A and B will extract Ni ions and not extract the aluminum ions from the aqueous solution. Based on this discovery, a new method of separating cobalt, nickel and aluminum ions contained in a sulfuric acid aqueous solution is developed; which comprises the steps of:

contacting a first water immiscible organic solution containing said Extractant A dissolved therein with said sulfuric acid aqueous solution for a period of time sufficient to extract substantially all the Co ions into the first organic solution, whereby a first organic phase containing substantially pure Co ions and a first raffinate aqueous phase containing substantially no Co ions are obtained; separating the first organic phase and the first raffinate aqueous phase; contacting a second water immiscible organic solution containing said Extractant A and Extractant B dissolved therein with said first raffinate aqueous solution for a period of time sufficient to extract substantially all the Ni ions into the second organic solution, whereby a second organic phase containing substantially pure Ni ions and a second raffinate aqueous phase containing substantially pure Al ions are obtained; separating the second organic phase and the second raffinate aqueous phase, wherein the total concentration of said Extractant A and B in said second organic solution is 1–80 vol %, and the volume ratio of said Extractant A to said Extractant B is 1:10 to 1:1. Preferably, the total concentration of said Extractant A and B in said second organic solution is 10–40 vol %, and the volume ratio of said Extractant A to said Extractant B is 1:5 to 1:1.

Preferably, the first organic phase, after being separated from the first raffinate aqueous phase, is contacted with a 3 to 6N inorganic acid, such as sulfuric acid or hydrochloric acid aqueous solution for a period of time such that the cobalt ions contained in the first organic phase is stripped into the inorganic acid aqueous solution, and the decobaltized first organic phase can be recovered and recycled to the first organic phase.

Preferably, the second organic phase, after being separated from the second raffinate aqueous phase, is contacted with a 3 to 6N inorganic acid, such as hydrochloric acid aqueous solution for a period of time such that the nickel ions contained in the second organic phase is stripped into the inorganic acid aqueous solution, and the denickelized second organic phase can be recovered and recycled to the second organic phase.

The second raffinate aqueous solution mainly is a sulfuric acid aqueous solution containing substantially pure aluminum ions and can be directly utilized in certain commercial processes. The cobalt and nickel ions stripped into those inorganic acid solutions can be recovered as cobalt and nickel metals by any suitable methods known in the prior art.

There is no particular restriction for those organic solvents used in both the first water immiscible organic phase and the second water immiscible organic phase. Generally, they must be water immiscible and should not react with the extractants. Typical solvents include aliphatic and aromatic hydrocarbon liquid solvents such as kerosene, fuel oil, benzene, toluene, and xylene.

Suitable sulfuric acid aqueous solutions containing Co, Ni and Al ions used in the present invention have a pH value less than 6, preferably less than pH=4.

The following examples are presented to better illustrate the present invention and are not meant to be limiting. All the percentages and parts used in the examples are based on volume, unless otherwise indicated..

Example 1

A sulfuric acid aqueous solution having 0.40M aluminum, 0.010M Cobalt, and 0.0150M nickel ions, and a pH value 2.85, was well mixed with a 6.6% Bis(2,4,4-trimethyl pentyl dithiophosphinic acid) kerosene solution, and left to equilibrate at 30° C. for 15 minutes. The volume ratio of the organic phase to the aqueous phase was 1. The pH value of the aqueous phase became 1.85 after being left to equilibrate for 15 minutes. A 6N sulfuric acid aqueous solution was used to strip cobalt ions from the organic phase. The results are summarized in Table 1.

TABLE 1

| Distribution Coefficient[1] | Separation Factor[2] | Stripping Percentage[3] |
|---|---|---|
| Al = 0.05 | Co/Al = 858 | Co = 85% |
| Co = 42.9 | | |
| Ni = 0.14 | | |

[1]Distribution Coefficient = $\dfrac{\text{concentration of metal ions in organic phase}}{\text{concentration of metal ions in aqueous phase}}$

[2]Separation Factor of X/Y = $\dfrac{\text{Distribution Coefficient of X metal}}{\text{Distribution Coefficient of Y metal}}$

[3]Stripping percentage = $\left( \dfrac{\text{metal ions conc. in a 6N sulfuric acid solution}}{\text{metal ions conc. in organic phase}} \right) \times 100\%$ The raffinate aqueous phase after the extraction procedure mainly containing aluminum and nickel ions, were extracted using the extractant compositions listed in Table 2, wherein kerosene was used as the organic solvent, the volume ratio of the organic phase versus aqueous phase was 1, and the pH value of aqueous phase after being extracted at 30° C. for 15 minutes equilibration time became 1.6. The resulting organic phase which contained nickel ions after the extraction was stripped by a 6N sulfuric acid, and the results are summarized in Table 2.

TABLE 2

| | First Test | Second Test |
|---|---|---|
| Extractant in Organic Phase (Volume %) | | |
| Bis(2,4,4-trimethyl pentyl) dithiophosphinic acid | 6.6 | 10.0 |
| Dibutylbutyl phosphonate | 23.0 | 17.5 |
| Distribution Coefficient | | |
| Aluminum | 0.04 | 0.09 |
| Nickel | 69.1 | 49.0 |
| Separation Factor | | |
| Nickel/Aluminum | 1728 | 544 |
| Stripping Percentage | | |
| Nickel | 96.6% | 97.0% |

From the data of Tables 1 and 2, it is obvious that cobalt and nickel ions can be extracted effectively from the aluminum rich sulfuric acid aqueous solution. The results are consistent with the concept that extraction of high value with small quantity ions should be conducted first.

Control Example

The object of this example is to illustrate that a water immiscible aqueous solution of only Extractant B Cannot extract cobalt and nickel ions from a given sulfuric solution which contains cobalt, nickel, and aluminum ions.

A sulfuric acid aqueous solution (same as Example 1) was mixed with a dibutylbutyl phosphonate dissolved in kerosene (6.6 % volume ratio), and the mixture was left for 15 minutes at 30° C. The ratio of organic phase versus aqueous phase was 1:1. The metal ions concentrations in both phases were analyzed, and their values were used in calculating the following:

TABLE 3

| Distribution Coefficient | Separation Factor |
|---|---|
| Al = 0.15 | Co/Al = 0.4 |
| Co = 0.06 | Ni/Al = 1.2 |
| Ni = 0.18 | |

It can be seen from the data shown in Table 3 that the Extractant B kerosene solution can not extract aluminum, cobalt, and nickel ions from the sulfuric acid aqueous solution effectively.

Overall, from the above two examples, it is clear that a kerosene solution containing only the Extractant A dissolved therein can not extract aluminum and nickel ions from a sulfuric acid aqueous solution containing cobalt, nickel and aluminum ions effectively, neither a kerosene solution containing only the Extractant B could extract aluminum, cobalt, and nickel ions from the aqueous solution effectively. However, when a kerosene solution containing both the Extractants A and B dissolved therein, it can selectively extract nickel ions from a sulfuric acid aqueous solution containing nickel ions and aluminum ions effectively.

What is claimed is:

1. A method for separating aluminum, cobalt, and nickel ions contained in a sulfuric acid aqueous solution comprising the steps of:

contacting a first water-immiscible organic solution containing a first extractant dissolved therein with said sulfuric acid aqueous solution so as to obtain a Co-containing first organic phase and a first raffinate aqueous phase;

separating said Co-containing first organic phase from said first raffinate aqueous phase;

contacting a second water-immiscible organic solution containing said first extractant and a second extractant dissolved therein with said first raffinate aqueous phase for a period of time sufficient to selectively extract said Ni ions into said second water-immiscible organic solution so as to obtain a Ni-containing second organic phase and a second raffinate aqueous phase;

separating said Ni-containing second organic phase from said second raffinate aqueous phase; wherein said first extractant is bis(2,4,4-trimethyl pentyl) dithiophosphinic acid; and said second extractant is trialkyl phosphonate having a formula as follows:

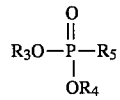

where
   $R_3$, $R_4$, $R_5$ are $C_3$ to $C_{18}$ alkyl radicals;

further wherein said second water-immiscible organic solution contains a combined concentration of said first extractant and said second extractant of 1–80 vol %, with a volume ratio between said first extractant and said second extractant from 1:10 to 1:1.

2. A method according to claim 1, wherein said combined concentration of said first extractant and said second extractant in said second water-immiscible organic solution is 10–40 vol %, and said volume ratio between said first extractant and said second extractant is from 1:5 to 1:1.

3. A method according to claim 1, wherein said second extractant is dibutylbutyl phosphonate.

4. A method according to claim 1, wherein both of said first and second water-immiscible organic solutions contain an aliphatic or aromatic hydrocarbon liquid solvent.

5. A method according to claim 4, wherein said aliphatic or aromatic hydrocarbon liquid solvent is selected from the group consisting of kerosene, fuel oil, benzene, toluene, and xylene.

* * * * *